(12) United States Patent
Park

(10) Patent No.: US 8,614,726 B2
(45) Date of Patent: Dec. 24, 2013

(54) LIGHT SCANNING UNIT AND ELECTROPHOTOGRAPHIC IMAGE FORMING APPARATUS USING THE SAME

(75) Inventor: Gi-sung Park, Hwaseong-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 147 days.

(21) Appl. No.: 13/197,300

(22) Filed: Aug. 3, 2011

(65) Prior Publication Data

US 2012/0105570 A1     May 3, 2012

(51) Int. Cl.
*B41J 2/447*     (2006.01)

(52) U.S. Cl.
USPC ........................................... 347/235

(58) Field of Classification Search
USPC ......... 347/129, 130, 132, 134, 137, 224, 225, 347/233, 235, 241, 243, 230, 256, 258, 260, 347/261
See application file for complete search history.

(56) References Cited

U.S. PATENT DOCUMENTS

| | | | |
|---|---|---|---|
| 7,050,209 B2 | 5/2006 | Kato | |
| 2008/0225105 A1 | 9/2008 | Kudo | |

FOREIGN PATENT DOCUMENTS

| | | |
|---|---|---|
| JP | 2005164997 | 6/2005 |
| JP | 2010032682 | 2/2010 |

OTHER PUBLICATIONS

Machine-generated translation of JP 2010-032682, published on Feb. 2010.*
Machine-generated translation of JP 2005-164997, published on Jun. 2005.*
European Search Report Issued on Jan. 26, 2012 in EP Patent Application No. 11171541.3.

* cited by examiner

*Primary Examiner* — Huan Tran
(74) *Attorney, Agent, or Firm* — Stanzione & Kim, LLP

(57) ABSTRACT

A light scanning unit includes a light source unit to emit a plurality of light beams, a light deflector to deflect the plurality of light beams emitted from the light source unit in a sub-scanning direction, an incident optical system to allow the plurality of light beams emitted from the light source unit to be incident on different reflection surfaces of the light deflector, and an imaging optical system that allows a plurality of light beams that are deflected by the light deflector, to be imaged on different scanning surfaces, wherein the incident optical system includes at least one incident light path changing member that folds light paths of the plurality of light beams between the light source unit and the light deflector.

35 Claims, 6 Drawing Sheets

LIGHT SCANNING UNIT AND ELECTROPHOTOGRAPHIC IMAGE FORMING APPARATUS USING THE SAME

CROSS-REFERENCE TO RELATED APPLICATIONS

This application claims the benefit of priority under 35 U.S.C. §119 from Korean Patent Application No. 10-2010-0108389, filed on Nov. 2, 2010, in the Korean Intellectual Property Office, the disclosure of which is incorporated herein in its entirety by reference.

BACKGROUND OF THE INVENTION

1. Field of the Invention

The present general inventive concepts relates to a light scanning unit and electrophotographic image forming apparatuses using the light scanning unit, and more particularly, to a light scanning unit simultaneously scanning a plurality of light beams and electrophotographic image forming apparatuses using the light scanning unit.

2. Description of the Related Art

Light scanning units scan a laser beam onto a photoconductor to form an electrostatic latent image in an electrophotographic image forming apparatus such as a laser printer. The light scanning units include a light deflector that deflects a light beam emitted from a light source and scans the same onto a photoconductor, and an imaging optical system that is placed between the light deflector and the photoconductor and forms the deflected light beam as an image on the photo conductor.

In an electrophotographic image forming apparatus, when a light scanning unit scans a light beam onto a photoconductor such as a photosensitive drum, an electrostatic latent image is formed on the photoconductor by main-scanning by the light scanning unit and sub-scanning by movement of the photoconductor. The electrostatic latent image is developed to form a development image by using a development agent such as a toner, and the development image is transferred onto a printing medium.

Recently, technologies for reducing the size of an image forming apparatus such as a color laser printer and reducing the manufacturing costs thereof are being developed, and one such development tendency involves developing techniques for reducing the size of the light scanning unit and the manufacturing costs thereof.

SUMMARY OF THE INVENTION

One or more embodiments of the present general inventive concepts provide a light scanning unit having an arrangement of optical components that enables the light scanning unit to have a compact size and a reduction in manufacturing costs thereof, and electrophotographic image forming apparatuses using the light scanning unit.

Additional utilities, features and advantages of the present general inventive concept will be set forth in part in the description which follows and, in part, will be obvious from the description, or may be learned by practice of the general inventive concept.

According to a feature and utilities of the present general inventive concepts, there is provided a light scanning unit including a light source unit to emit a plurality of light beams, a light deflector to deflect the plurality of light beams emitted from the light source unit in a main scanning direction, and an incident optical system to allow the plurality of light beams emitted from the light source unit to be incident on different reflection surfaces of the light deflector, wherein the incident optical system includes at least one incident light path changing member that folds light paths of the plurality of light beams between the light source unit and the light deflector.

The light source unit may include a plurality of light sources to respectively emit a plurality of light beams, and the plurality of light sources may be installed on a single circuit substrate.

The light deflector may include at least five reflection surfaces.

The light deflector may include N reflection surfaces, wherein a main scanning incident angle is an angle between a light beam that is incident to the light deflector and a light beam that is deflected by the light deflector and proceeds toward a center of a scanning surface, and the incident optical system may allow a plurality of light beams emitted from the light source unit to be incident on the light deflector at a main scanning incident angle of 360°/N. The light deflector may receive a light beam incident on a first reflection surface and a light beam incident on a second reflection surface symmetrically at opposite sides with respect to the light deflector.

The light scanning unit may further include a synchronization detection sensor to detect any of the plurality of light beams deflected by the light deflector. The synchronization detection sensor may detect a first scanning end from among the first scanning end and the second scanning end of a main scanning line of any of the plurality of light beams deflected by the light deflector.

The light scanning unit may further include a synchronization light path changing member that is disposed between the light deflector and the synchronization detection sensor and folds a light path of a light beam to detect synchronization.

The synchronization detection sensor may be installed on a single circuit substrate together with the plurality of light sources.

The synchronization light path changing member may be formed as a single unit with an incident light path changing member that folds a light path of the light beam to detect synchronization in an incident optical system.

The light scanning unit may further include a synchronization detection lens disposed between the light deflector and the synchronization detection sensor.

The at least one incident light path changing member may include a mirror.

The light source unit may include first through fourth light sources respectively emitting first through fourth light beams, and the incident optical system may allow the first and second light beams emitted from the first and second light sources to be incident on a first reflection surface of the light deflector, and allow the third and fourth light beams emitted from the third and fourth light sources to be incident on a second reflection surface of the light deflector.

An incident angle of a light beam incident on a reflection surface of the light deflector in a sub-scanning direction is referred to as a sub-scanning incident angle, and the incident optical system may be an inclined optical system that allows the first and second light beams emitted from the first and second light sources to be incident on the first reflection surface of the light deflector at different sub-scanning incident angles, and allows the third and fourth light beams emitted from the third and fourth light sources to be incident on the second reflection surface of the light deflector at different sub-scanning incident angles. Sub-scanning incident angles of the first through fourth light beams may be in a range from 0 to 10 degrees.

The at least one incident light path changing member may include a first incident light path changing member folding light paths of the first and second light beams emitted from the first and second light sources and a second incident light path changing member folding light paths of the third and fourth light beams emitted from the third and fourth light sources. The first through fourth light sources may be installed on a single circuit substrate.

The light deflector may receive first and second light beams incident on the first reflection surface and third and fourth light beams incident on the second reflection surface symmetrically at opposite sides with respect to the light deflector.

The light scanning may further include a synchronization detection sensor to detect any of the first through fourth light beams deflected by the light deflector.

Also, the light scanning may further include a synchronization light path changing member that is disposed between the light deflector and the synchronization detection sensor and folds a light path of a light beam to detect synchronization.

The synchronization light path changing member may be formed as a single unit with an incident light path changing member that folds a light path of the light beam to detect synchronization, in the incident optical system. For example, when the synchronization detection sensor detects the third beam, the second incident light path changing member which changes a light path of the third light beam in the incident optical system may perform the function of the synchronization light path changing member at the same time. As the light path in the incident optical system and the light path in the synchronization detection system are appropriately changed using the first and second incident light path changing members, the first through fourth light sources and the synchronization detection sensor may be installed on the single circuit substrate.

The incident optical system may further include at least one of a collimating lens, a cylindrical lens, and an aperture stop. The collimating lens, the cylindrical lens, and the aperture stop may be formed for each of the light beams or may be used in common regarding some of the light beams.

The light scanning unit may further include an imaging optical system that allows a plurality of light beams that are deflected by the light deflector, to be imaged on different scanning surfaces.

According to another feature and utilities of the present general inventive concepts, there is provided an image forming apparatus, including a light scanning unit including a light source unit to emit a plurality of light beams, a light deflector to deflect the plurality of light beams emitted from the light source unit in a main scanning direction, and an incident optical system to allow the plurality of light beams emitted from the light source unit to be incident on different reflection surfaces of the light deflector, a developing unit that is disposed at an imaging point of each of the plurality of light beams emitted from the light scanning unit and includes a plurality of photoconductors, on which respective electrostatic latent images are formed according to the plurality of light beams, and a developing roller that develops the electrostatic latent images formed on the plurality of photoconductors, and a transferring unit onto which the image developed by the developing unit is transferred, wherein the incident optical system includes at least one incident light path changing member that folds light paths of the plurality of light beams between the light source unit and the light deflector.

According to another feature and utilities of the present general inventive concepts, there is provided an light scanning unit including a light source unit to emit a plurality of light beams, a light deflector to deflect the plurality of light beams along a plurality of main scanning directions, and an optical system having at least one incident light path changing member disposed opposite to the light source unit with respect to the main scanning directions to direct the plurality of light beams to different surfaces of the light deflector.

The at least one incident light path changing member may be disposed to have a first travel path from the light source unit having a first travel length and a second travel path from the light deflector having a second travel length, and the first travel length may be longer than the second travel length. Further, an angle between the first travel path and the second travel path may be greater than 0° and less than 90°. In addition, the emitted light beams may be substantially parallel to one another before reaching the at least one incident light path changing member. The emitted light beams pass over the light deflector before reaching the at least one incident light path changing member.

The optical system may include collimating lenses corresponding to the respective emitted light beams to collimate the respective emitted light beams and aperture stops corresponding to the respective emitted light beams to adjust diameters of the respective emitted light beams. The optical system may further include one or more cylindrical lens configured to focus the emitted light beams from the one or more of the aperture stops.

BRIEF DESCRIPTION OF THE DRAWINGS

The above and other features and advantages of the present general inventive concept will become more apparent by describing in detail exemplary embodiments thereof with reference to the attached drawings in which.

DETAILED DESCRIPTION OF THE PREFERRED EMBODIMENTS

Figure 1:
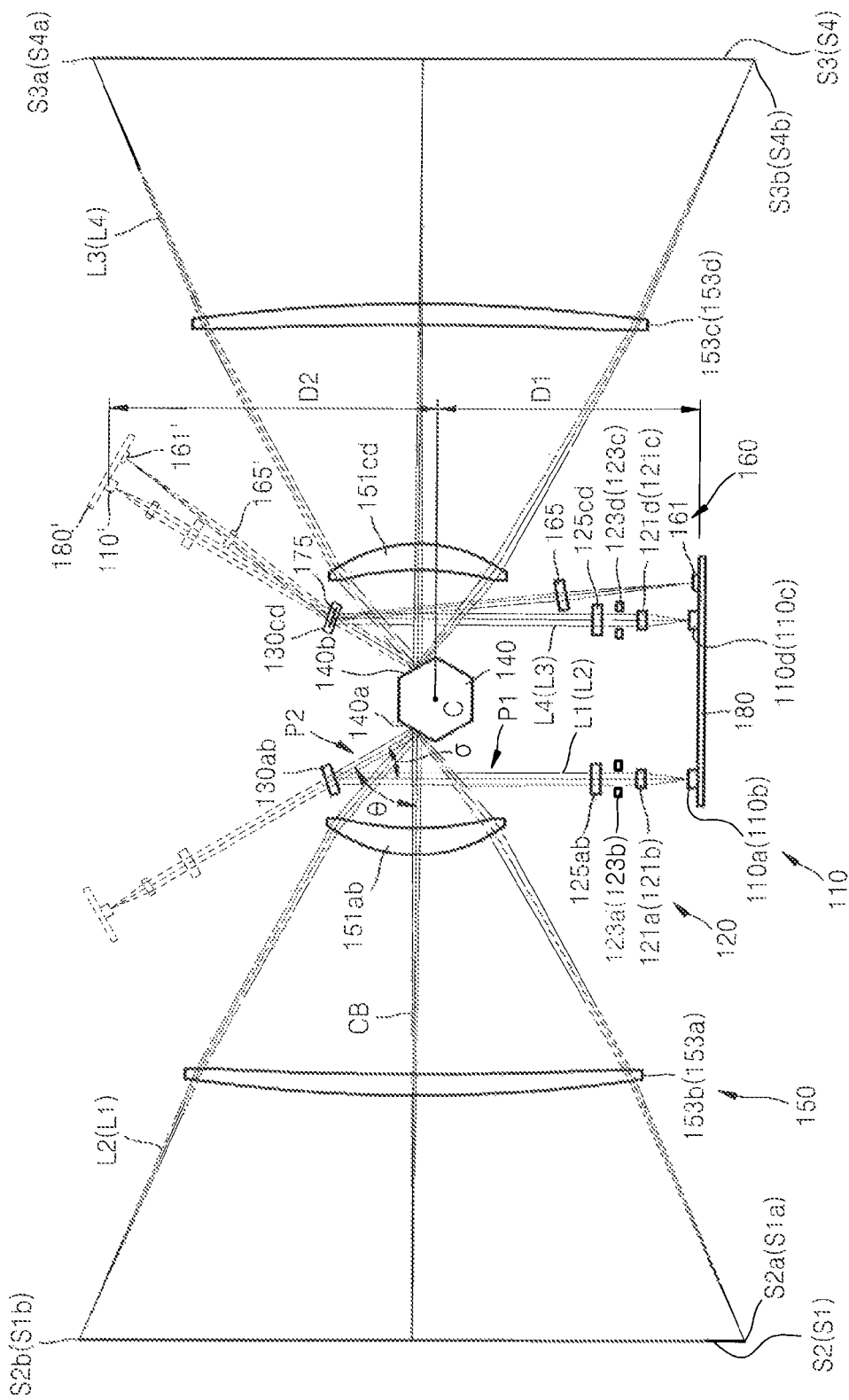
FIG. 1 is a schematic view illustrating an arrangement of optical components along a main scanning plane of a light scanning unit according to an embodiment of the present general inventive concepts.

The present general inventive concepts will now be described more fully with reference to the accompanying drawings, in which exemplary embodiments of the invention are shown. Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures. The invention should not be construed as being limited to the embodiments set forth herein; rather, these embodiments are provided so that this disclosure will be thorough and complete, and will fully convey the concept of the invention to those of ordinary skill in the art. In the drawings, the thicknesses of layers and regions are exaggerated for clarity.

In this specification, a main scanning direction refers to a deflection direction in which a light beam is deflected by a light deflector 140 or 240 (FIG. 1 or FIG. 4), and a sub-scanning direction refers to a direction that is perpendicular to both a direction of a central light beam CB (see FIGS. 1 and 4) of the light beam deflected by the light deflector 140 or 240 and the main scanning direction. A main scanning plane refers to a plane on which a light beam deflected by the light deflector 140 or 240 is swept, and a sub-scanning plane refers to a plane that is perpendicular to the main scanning direction. A light path of the light beam may be folded by a light path changing member such as a reflection mirror, and thus the main scanning direction and the sub-scanning direction may be changed according to the light path.

Figure 2A:
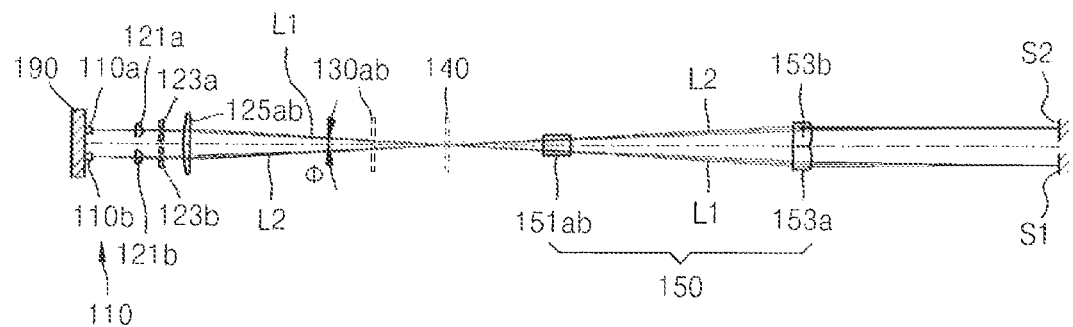
FIGS. 2A and B are schematic views illustrating an arrangement of optical elements along a sub-scanning plane of the light scanning unit of FIG. 1 and in a perspective view of one side of the light scanning unit of FIG. 1.
Figure 2B:
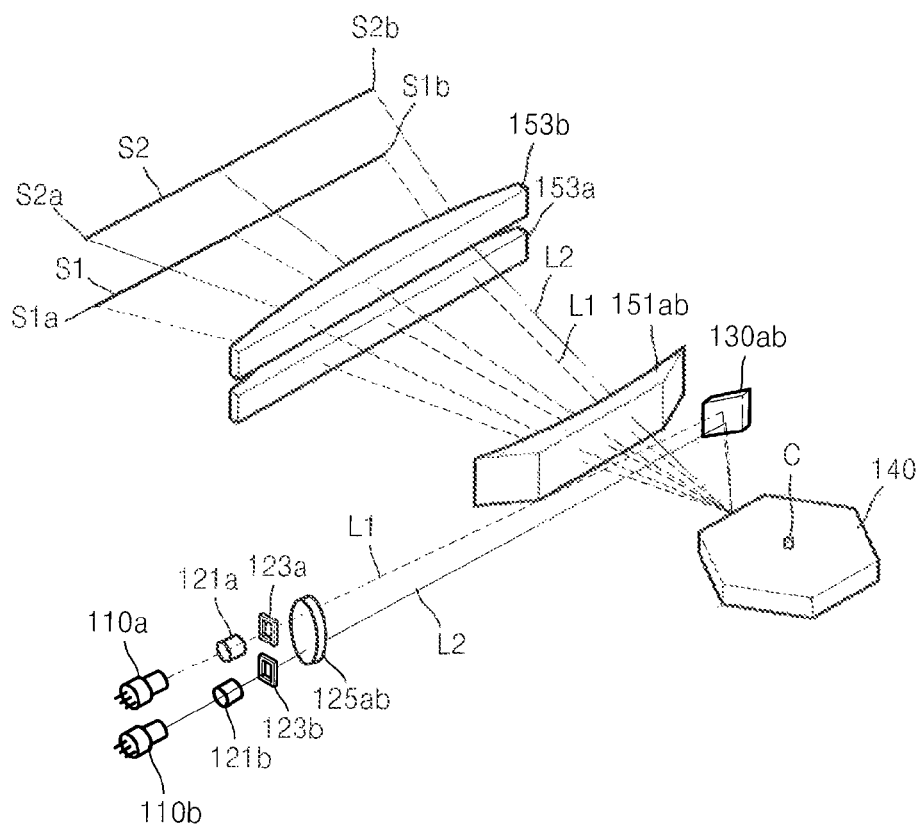

FIG. 1 is a schematic view illustrating an arrangement of optical components along a main scanning plane of a light scanning unit 100 according to an embodiment of the present general inventive concepts, and FIG. 2 is a schematic view illustrating the arrangement of optical elements along a sub-scanning plane of the light scanning unit 100 of FIG. 1. For convenience of illustration, in FIG. 1, an imaging optical system 150 is illustrated in such a manner that a light path is not folded except at locations where the light path is folded by the light path changing member 130ab and the light deflector 140. Also, the entire optical system of the light scanning unit 100 in FIG. 2A also is illustrated in such a manner that a light path is not folded or not deflected. Thus, the optical system shown in FIG. 2A is a simplified version that omits folding of the light path at the incident light path changing member 130ab and the light deflector 140. FIG. 2B is a perspective view of the left side of the light scanning unit 100 of FIG. 1, thus showing the light beams L1 and L2, and their corresponding incident optical system 120 and imaging optical system 150. Although to FIG. 2A shows light paths without beam folding of light beams L1 and L2, FIG. 2B shows the beam folding of the light beams L1 and L2 by the first light path changing member 130a and the light deflector 140. FIG. 2B illustrates the components of the left side of the light scanning unit of FIG. 1 in a perspective view, showing the light beams L1 and L2.

Referring to FIGS. 1 and 2, the light scanning unit 100 includes a light source unit 110, an incident optical system 120, a light deflector 140, an imaging optical system 150, and a synchronization detection optical system 160.

The light source unit 110 may include first through fourth light sources 110a, 110b, 110c, and 110d. The first through fourth light sources 110a, 110b, 110c, and 110d emit first through fourth light beams L1, L2, L3, and L4 that are modulated according to image information. By way of an example, the light beams L1, L2, L3, and L4 may correspond to four colors, for example, black (K), magenta (M), yellow (Y), and cyan (C) and may be modulated according to image information to create an image. The first through fourth light sources 110a, 110b, 110c, and 110d may also be, for example, semiconductor laser diodes that emit a laser beam. The first and second light sources 110a and 110b may be arranged side by side in a sub-scanning direction, as illustrated in FIG. 2A. In FIG. 1, the first and second light sources 110a and 110b are seen as being overlapped with each other. The third and fourth light sources 110c and 110d are also arranged side by side in the sub-scanning direction, and are seen as being overlapped with each other in FIG. 1. In other words, the second light source 110b and the fourth light source 110d are located behind the first light source 110a and the third light source 110c in FIG. 1 in an out-of-plane direction (the sub-scanning direction), and thus are not separately shown in FIG. 1.

The first through fourth light sources 110a, 110b, 110c, and 110d may be placed adjacent to one another due to first and second incident light path changing members 130ab and 130cd, as will be described later, and are thus installed on a single circuit substrate 180. According to the current embodiment, the light source unit 110 formed of four light sources are disposed on the single circuit substrate 180, and thus the number of components of the light scanning unit 100 may be reduced, thereby facilitating assembly of the light scanning unit 100 and reduction of the manufacturing costs.

Also, collimating lenses 121a, 121b, 121c, and 121d may be disposed on light paths of the first through fourth light beams L1, L2, L3, and L4 between the light source unit 110 and the light deflector 140. The collimating lenses 121a, 121b, 121c, and 121d are condensing lenses that allow the first through fourth light beams L1, L2, L3, and L4 emitted from the light source unit 110 to be formed as collimated light or convergent light.

Cylindrical lenses 125ab and 125cd may be positioned on the light paths of the first through fourth light beams L1, L2, L3, and L4 between the collimating lenses 121a, 121b, 121c, and 121d and the light deflector 140. The cylindrical lenses 125ab and 125cd are anamorphic lenses that focus the first through fourth light beams L1, L2, L3, and L4 in directions corresponding to the main scanning direction and/or sub-scanning direction to form a linear image on a reflection surface of the light deflector 140. As illustrated in FIGS. 2A and 2B, the first light beam L1 and the second light beam L2 may be incident on the light deflector 140 with a predetermined distance the first light beam L1 and the second light beam L2 in the sub-scanning direction, while still being adjacent to each other. Thus, one cylindrical lens 125ab may be used for both the first light beam L1 and the second light beam L2. Likewise, one cylindrical lens 125cd may be used for both the third light beam L3 and the fourth light beam L4. According to circumstances, cylindrical lenses 125ab and 125cd may be separately positioned on each of the light paths of the first through fourth light beams L1, L2, L3, and L4, respectively.

Also, aperture stops 123a, 123b, 123c, and 123d may be further respectively disposed on the light paths of the first through fourth light beams L1, L2, L3, and L4 between the collimating lenses 121a, 121b, 121c, and 121d and the cylindrical lenses 125ab and 125cd to adjust diameters of the first through fourth light beams L1, L2, L3, and L4. The collimating lenses 121a, 121b, 121c, and 121d, the aperture stops 123a, 123b, 123c, and 123d, and the cylindrical lenses 125ab and 125cd constitute the incident optical system 120 with respect to the light deflector 140.

The incident optical system 120 further includes first and second incident light path changing members 130ab and 130cd to fold (e.g., to change directions of) the light paths of the first through fourth light beams L1, L2, L3, and L4, Mirrors having reflection surfaces or prisms using total internal reflection may be used as the first and second incident light path changing members 130ab and 130cd, such that the light paths may be folded by reflection. The first and second incident light path changing members 130ab and 130cd may be disposed between the cylindrical lenses 125ab and 125cd and the light deflector 140. As described above, the first light beam L1 and the second light beam L2 are incident on the light deflector 140, while being adjacent to each other, and thus one first incident light path changing member 130*ab* may be used for the first light beam L1 and the second light beam L2, Likewise, one second incident light path changing member 130*cd* may be used for the third light beam L3 and the fourth light beam L4. According to the circumstances, incident light path changing members may be separately provided on the light paths of the first through fourth light beams L1, L2, L3, and L4, respectively.

The light deflector 140 is a polygonal mirror having multiple reflection surfaces. In the example shown in FIG. 1, the light deflector 140 is a hexagonal mirror having six reflection surfaces including the first and second reflection surfaces 140*a* and 140*b*, and may be rotated at a predetermined speed by a driving unit (not shown) such as a spindle motor. The light deflector 140 may be rotated with respect to a rotational axis C. Due to rotation of the light deflector 140, the first through fourth light beams L1, L2, L3, and L4 are deflected and scanned onto scanning surfaces S1, S2, S3, and S4 in the main scanning direction.

As illustrated in FIG. 2A, the incident optical system 120 allows the first and second light beams L1 and L2 incident on the first reflection surface 140*a* of the light deflector 140 to be inclined at different angles. Similarly, the incident optical system 120 also allows the third and fourth light beams L3 and L4 incident on the second reflection surface 140*b* of the light deflector 140 to be inclined at different angles. The first reflection surface 140*a* of the light deflector 140 does not refer to a predetermined reflection surface but to a corresponding reflection surface of the light deflector 140 located at an incident position of the first and second light beams L1 and L2 since the light deflector 140 is a rotating polygonal mirror configured to rotate about the central axis C. The second reflection surface 140*b* also refers to a corresponding reflection surface located at an incident position of the third and fourth light beams L3 and L4.

An incident angle of the first through fourth light beams L1, L2, L3, and L4 incident on the first or second reflection surface 140*a* or 140*b* of the light deflector 140 in a sub-scanning direction is referred to as a sub-scanning incident angle $\phi$ (FIG. 2). If the sub-scanning angle $\phi$ is too small, it may be difficult to arrange the optical components on each of the light paths. Also, if the sub-scanning angle $\phi$ is too large, it may be difficult to design lens surfaces of the incident optical system 120 or the imaging optical system 150. Thus, according to the current embodiment, the sub-scanning angle $\phi$ may be in a range from 0 to 10 degrees.

As illustrated in FIGS. 2A and 2B, when the first light source 110*a* is located above the second light source 110*b* in the sub-scanning direction, the first light beam L1 and the second light beam L2 deflected by the light deflector 140 have their positions reversed. In other words, for example, the first light beam L1 is located above the second light beam L2 in the sub-scanning direction before the first light beam L1 and the second light beam L2 are deflected by the light deflector 140, but the first light beam L1 is located below above the second light beam L2 In the sub-scanning direction after being deflected by the light deflector 140. In FIG. 1, reference numerals denoted in brackets refer to optical members located down in the sub-scanning direction, when the first light source 110*a* is located above the second light source 110*b* in the sub-scanning direction, and the fourth light source 110*d* is located above the third light source 110*c* in the sub-scanning direction. Thus, as shown in FIG. 1 and FIGS. 2A and 2B, the first through fourth light beams L1, L2, L3, and L4 may be deflected by the light deflector both in the main scanning direction and the sub-scanning direction.

Meanwhile, since the incident optical system 120 according to the current embodiment is an inclined optical system as described above, a sufficient distance needs to be provided between the light source unit 110 and the light deflector 140 so that the respective optical components on the light paths are separated from one another optically and instrumentally (e.g. the light paths are separate from one another and the optical components are separated from one another). Thus, according to a conventional approach, this distance may make it difficult to allow the light scanning unit 100 to have a compact size. According to the current embodiment of the present general inventive concepts, light paths of the incident optical system 120 are folded by the first and second incident light path changing members 130*ab* and 130*cd*, and thus a distance between the light source unit 110 and the rotational axis C, which is the center of the light deflector 140, is relatively shortened, thereby further reducing the size of the light scanning unit 100. On the other hand, in FIG. 1, dotted lines denote an incident optical system not including the first and second incident light path changing members 130*ab* and 130*cd*, and thus the light paths shown in the as dotted lines are not folded by any light path changing member. In this case, the total distance the light beam from the light source unit 110' travels to reach the light deflector 140 is the same as the total distance the light beam travels from the light source unit 110 to the light deflector 140. However, because the light paths from the light source unit 110 is folded by the first and second incident light path changing members 130*ab* and 130*cd*, a distance D1 between a light source unit 110 and the rotational axis C of the light deflector 140 according to the current embodiment in FIG. 1 is relatively shorter compared to a distance D2 between the light source unit 110' and the rotational axis C, thereby reducing the size of the entire incident optical system.

Further, a first travel path (P1) of the first light beam L1 from the first light source 110*a* to the first light path changing member 130*ab* may have a first travel length TL1 longer than a second travel length TL2 which is a length of a second travel path (P2) of the first light beam L1 from the first light path changing member 130*ab* to the light deflector 140. In addition, the angle $\sigma$ between the first travel path P1 and the second travel path P2 may be greater than 0° and less than 90°.

Also, as shown in the dotted lines, multiple circuit substrates 180 are needed for the light source units 110' when no light path changing members are used. On the contrary, according to the current embodiment, as the light paths in the incident optical system 120 are folded by the first and second incident light path changing members 130*ab* and 130*cd* in the light scanning unit 100, the first and second light sources 110*a* and 110*b* and the third and fourth light sources 110*c* and 110*d* may be disposed adjacent to each other. Accordingly, the first through fourth light sources 110*a*, 110*b*, 110*c*, and 110*d* may be disposed on the single circuit substrate 180, thereby reducing the manufacturing cost and complexity.

When an angle between the first through fourth light beams L1, L2, L3, and L4 incident on the light deflector 140 and the central light beam CB that is deflected by the light deflector 140 and proceeds toward a center of a scanning surface is a main scanning incident angle $\theta$, the main scanning incident angle $\theta$ of each of the first through fourth light beams L1, L2, L3, and L4 may be approximately 60 degrees with respect to the light deflector 140 which is a hexagonal mirror. When the incident optical system 120 allows the first through fourth light beams L1, L2, L3, and L4 to be incident on the light deflector 140 at the main scanning incident angle $\theta$ of approximately 60 degrees, the first and second light beams L1 and L2 and the third and fourth light beams L3 and L4 are scanned symmetrically at opposite sides with respect to the light deflector 140. That is, a direction in which the first and second light beams L1 and L2 are scanned onto the scanning surfaces S1 and S2 and a direction in which the third and fourth light beams L3 and L4 are scanned onto the scanning surfaces S3 and S4 are opposite to each other. In general, if the light deflector 140 is a polygonal mirror having N reflection surfaces, the main scanning incident angle θ of each of the first through fourth light beams L1, L2, L3, and L4 may be set to be 360°/N so as to provide symmetrical scanning at opposite sides. Thus, in a hexagonal mirror having 6 reflection surfaces (N=6), the main scanning incident angle θ of each of the first through fourth light beams L1, L2, L3, and L4 may be set to be 360°/6=60°.

The imaging optical system 150 is a scanning optical unit having a converging function and f-θ characteristics, and allows the first through fourth light beams L1, L2, L3, and L4 to be respectively imaged on the scanning surfaces S1, S2, S3, and S4. The imaging optical system 150 may include first imaging optical lenses 151ab and 151cd and second imaging optical lenses 153a, 153b, 153c, and 153d. The first imaging optical lenses 151ab and 151cd and the second imaging optical lenses 153a, 153b, 153c, and 153d may each be a torus lens having, for example, two torus surfaces. As described above, since the first light beam L1 and the second light beam L2 are incident on the light deflector 140, while being adjacent to each other, the first imaging optical lens 151ab adjacent to the light deflector 140 may be used by both the first beam L1 and the second light beam L2 that are deflected by the light deflector 140. Likewise, the first imaging optical lens 151cd may be used by both the third light beam L3 and the fourth light beam L4 that are deflected by the light deflector 140. According to circumstances, the first imaging optical lenses 151ab and 151cd may be separately disposed on each of the light paths of the first through fourth light beams L1, L2, L3, and L4. Furthermore, while two lenses are positioned on each of the light paths of the first through fourth light beams L1, L2, L3, and L4 in the imaging optical system 150 according to the current embodiment, the current embodiment is not limited thereto, and the imaging optical system 150 may have various forms. For example, one lens or three or more lenses may be disposed on each of the light paths of the first through fourth light beams L1, L2, L3, and L4 in the imaging optical system 150.

Further, referring to FIG. 1, for the scanning surfaces S1, S2, S3 and S4, the light beams L1, L2, L3, and L4 may scan between first scanning ends S1a, S2a, S3a and S4a and second scanning ends S1b, S2b, S3b and S4b respectively, according to the rotation of the light deflector 140. The position of the rotating light deflector 140 may determine the angles of the reflection of the light beams L1, L2, L3, and L4 when deflected by the light deflector 140. For example, as the light deflector 140 rotates in a clockwise direction, the light beam L3(L4) may scan starting from the first scanning end S3a(S4a) to the second scanning end S3b(S4b), and the light beam L2(L1) may scan starting from the first scanning end S2a(S1a) to the second scanning end S2b(S1b).

Figure 3:
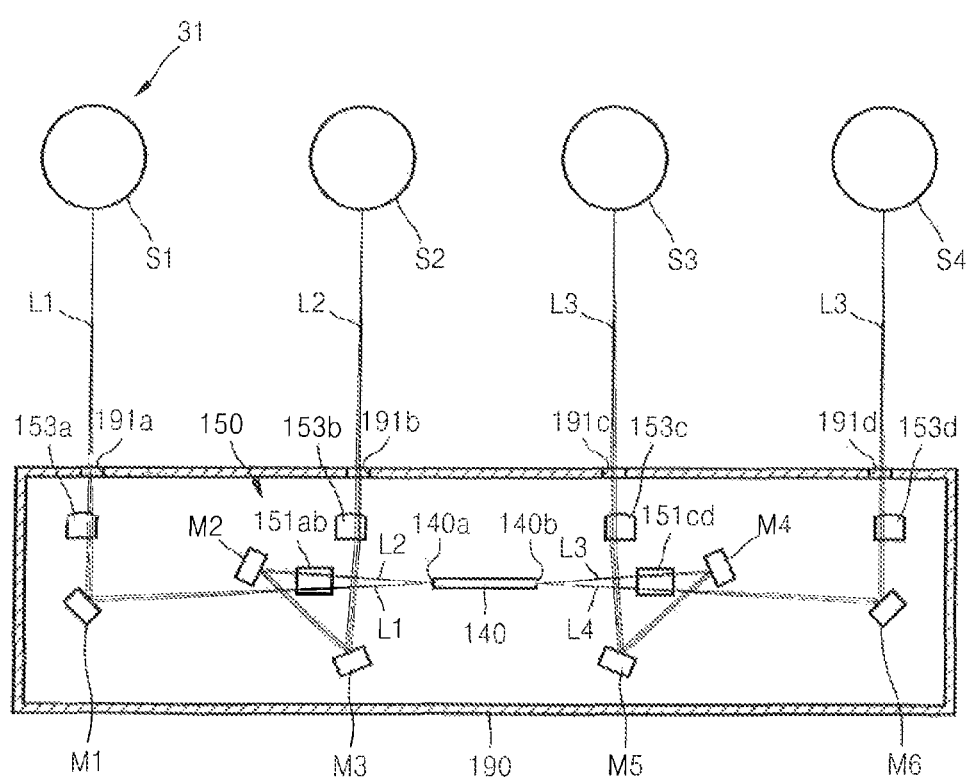
FIG. 3 illustrates an example of an arrangement of an imaging optical system of the light scanning unit of FIG. 1, according to an embodiment of the present general inventive concepts.

FIG. 3 illustrates an example of an arrangement of an imaging optical system of the light scanning unit 100 of FIG. 1, according to an embodiment of the present general inventive concepts. The view in FIG. 3 may be a top view when viewed from the top of the light deflector, such that C is the rotational axis of the light deflector. The optical components of the light scanning unit 100 is closely sealed in a housing 190, and the first through fourth light beams L1, L2, L3, and L4 are scanned through corresponding windows 191a, 191b, 191c and 191d to the outside. The light scanning unit 100 described above is used in an image forming apparatus, as will be described later, and scans the first through fourth light beams L1, L2, L3, and L4 onto the scanning surfaces S1, S2, S3, and 54 of photosensitive drums 31, respectively. As the positions of the photosensitive drums 31 may be limited by the instrumental arrangement in the image forming apparatus, light paths of the first through fourth light beams L1, L2, L3, and L4 in the imaging optical system 150 may be folded by the mirrors M1, M2, M3, M4, M5, and M6 according to positions of the photosensitive drums 31.

Referring to FIG. 1 again, as described above, the light scanning unit 100 has a structure in which the first and second light beams L1 and L2 and the third and fourth light beams L3 and L4 are scanned symmetrically at opposite sides with respect to the light deflector 140. Thus, by detecting a synchronization signal of any of the first through fourth light beams L1, L2, L3, and L4, detection of synchronization signals of the rest of the light beams may be omitted. Accordingly, the synchronization detection optical system 160 according to the current embodiment may process synchronization signals with respect to the first through fourth light beams L1, L2, L3, and L4 by using just one synchronization detection sensor 161.

In detail, for example, the synchronization detection sensor 161 may be disposed so as to detect synchronization of the main scanning direction of the third light beam L3 deflected by the light deflector 140. A synchronization light path changing member 175 is disposed such that a light beam at the first scanning end (S3a) from two scanning ends (S3a and S3b) of a main scanning line of the third light beam L3 formed by deflecting the light deflector 140, is reflected toward the synchronization detection sensor 161. Assuming that the light deflector 140 of FIG. 1 rotates clockwise, the third light beam L3 deflected by the light deflector 140 is scanned clockwise (e.g. from the first scanning end S3a to the second scanning end S3b of the scan surface S3) during one interval, and thus a light path of the third light beam L3 corresponding to the first scanning end S3a of the main scanning line of is adjacent to a light path that is incident on the light deflector 140 from the third light source 110c. Accordingly, according to the current embodiment, the second incident light path changing member 130cd may be formed as a single unit with the synchronization light path changing member 175 and thus may also perform the function of the synchronization light path changing member 175. Furthermore, a light beam to detect synchronization, which is reflected by the synchronization light path changing member 175, that is, the second incident light path changing member 130cd, is directed toward a position adjacent to the third light source 110c, and thus the synchronization detection sensor 161 may also be installed on the circuit substrate 180 on which the light source unit 110 is installed. As such, by installing the light source unit 110 and the synchronization detection sensor 161 on a single substrate, the circuit substrate 180, a circuit substrate for the synchronization detection sensor 161 may be omitted, thereby reducing the manufacturing costs.

A synchronization detection lens 165 allowing a light beam to detect synchronization, to be focused to the synchronization detection sensor 161 may be interposed between the synchronization detection sensor 161 and the second incident light path changing member 130cd. In the current embodiment, the synchronization light path changing member 175 is formed as a single unit with the second incident light path changing member 130cd as shown in FIG. 1 but according to circumstances, the synchronization light path changing member 175 and the second incident light path changing member 130cd may also be separately formed.

In the synchronization detection optical system 160 as described above, the synchronization detection sensor 161 may be formed as a single unit with the circuit substrate 180 on which the light source unit 110 is installed, and also, the synchronization detection lens 165 may be arranged with more freedom in choosing its position. For example, when the second incident light path changing member 130cd is not included, that is, in the case denoted by the dotted line of FIG. 1, it may be difficult to provide space for a synchronization detection lens 165' due to the imaging optical system 150, and spatial interference may occur between a circuit substrate 180', to which a synchronization detection sensor 161' is attached, and the imaging optical system 150. On the other hand, according to the current embodiment of the present general inventive concepts, the synchronization detection optical system 160 may be disposed with more freedom in choosing its position due to the second incident light path changing member 130cd.

Figure 4:
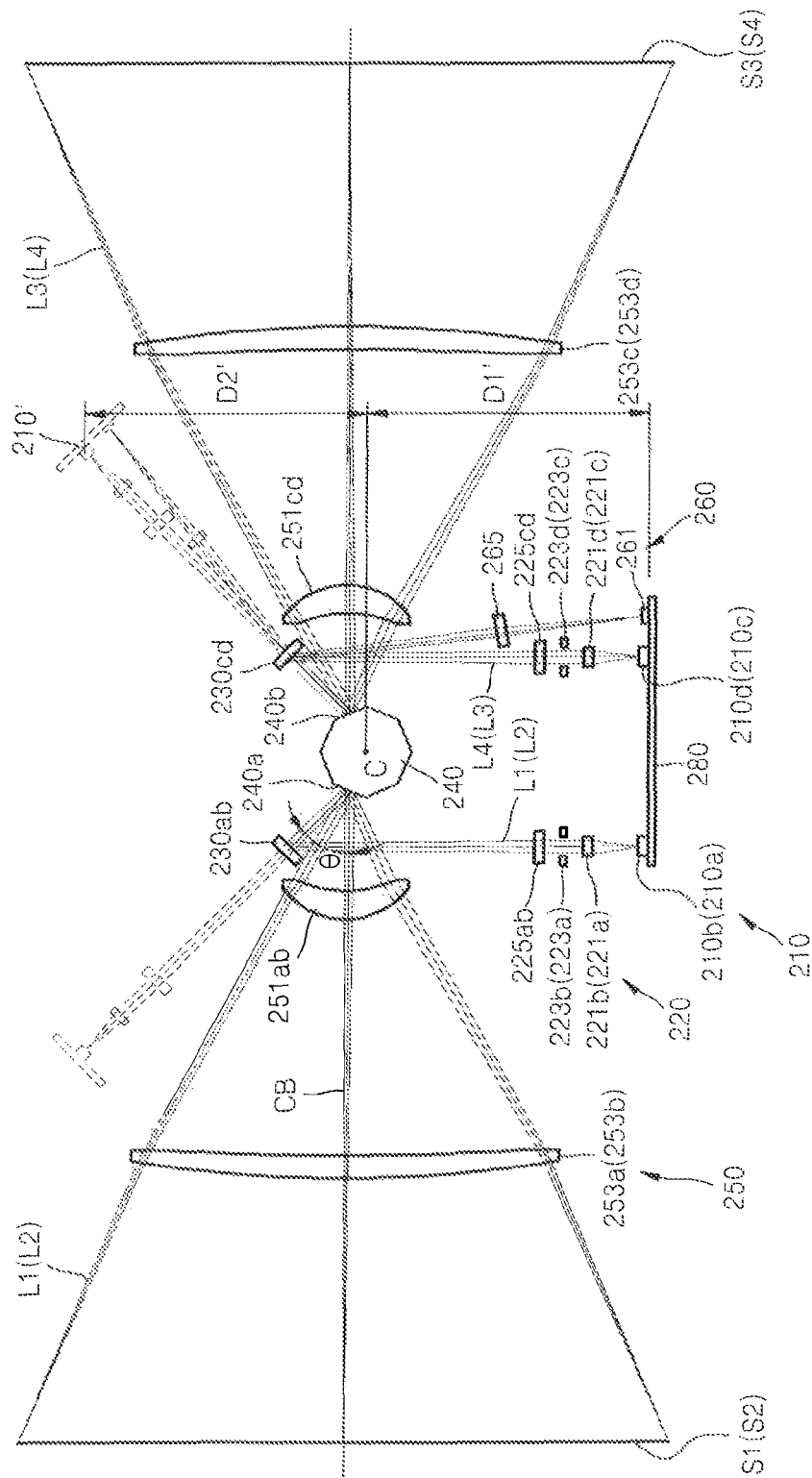
FIG. 4 is a schematic view illustrating an arrangement of optical components of a light scanning unit along a main scanning plane according to another embodiment of the present general inventive concepts.
Figure 5:
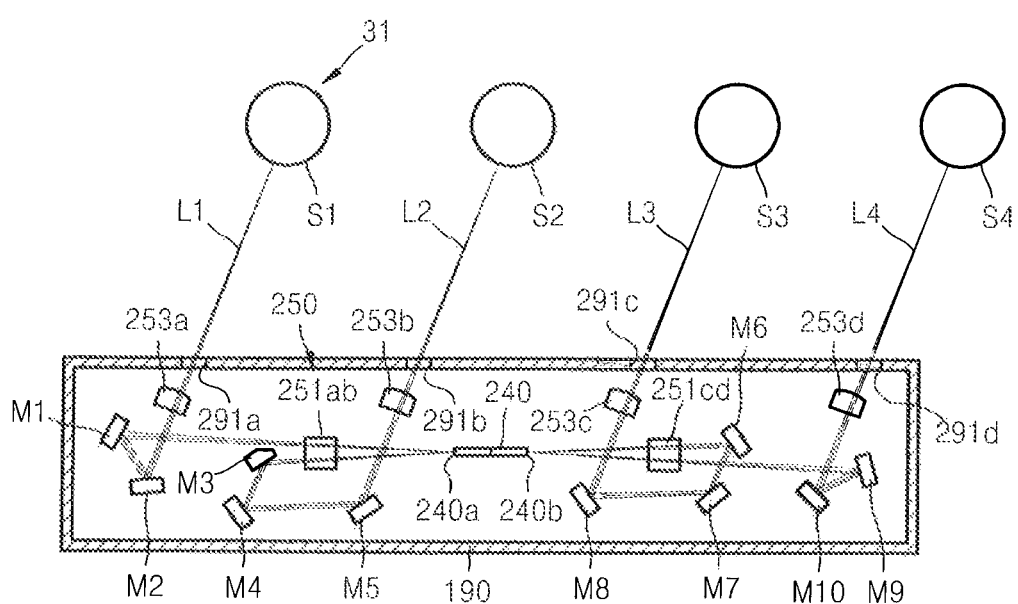
FIG. 5 illustrates an example of an arrangement of an imaging optical system of the light scanning unit of FIG. 4.

FIG. 4 is a schematic view illustrating an arrangement of optical components of a light scanning unit 200 along a main scanning plane according to another embodiment of the present general inventive concepts. FIG. 5 illustrates an example of an arrangement of an imaging optical system of the light scanning unit 200 of FIG. 4.

Referring to FIGS. 4 and 5, the light scanning unit 200 includes a light source unit 210, an incident optical system 220, a light deflector 240, an imaging optical system 250, and a synchronization detection optical system 260.

The light source unit 210 may include first through fourth light sources 210a, 210b, 210c, and 210d. The first through fourth light sources 210a, 210b, 210c, and 210d emit first through fourth light beams L1, L2, L3, and L4 that are modulated according to image information. The incident optical system 220 includes collimating lenses 221a, 221b, 221c, and 221d, cylindrical lenses 225ab and 223cd, aperture stops 223a, 223b, 223c, and 223d, and first and second incident light path changing members 230ab and 230cd. The light deflector 240 is a polygonal mirror having multiple reflection surfaces. In the example shown in FIG. 4, the light deflector 240 is an octagonal mirror having eight reflection surfaces including first and second reflection surfaces 240a and 240b, and may be rotated at a predetermined speed using a driving unit (not shown) such as a spindle motor. The light deflector 140 may be rotated with respect to a rotational axis C. The imaging optical system 250 may include first imaging optical lenses 251ab and 251cd and second imaging optical lenses 253a, 253b, 253c, and 253d. The synchronization detection optical system 260 includes a synchronization detection sensor 261 and a synchronization detection lens 265.

The incident optical system 220 allows the first and second light beams L1 and L2 incident on the first reflection surface 240a of the light deflector 240 to be inclined at different angles. Similarly, the incident optical system 120 also allows the third and fourth light beams L3 and L4 incident on the second reflection surface 240b of the light deflector 240 to be inclined at different angles. As the light deflector 240 is an octagonal mirror, main scanning incident angles θ of the first through fourth light beams L1, L2, L3, and L4 may be 45 degrees (360°/8=45°) with respect to the light deflector 240 which is the octagonal mirror, and accordingly, the first and second light beams L1 and L2 and the third and fourth light beams L3 and L4 are scanned symmetrically at opposite sides with respect to the light deflector 240.

The light scanning unit 200 has substantially the same optical configuration as that of the light scanning unit 100 except that the light deflector 240 is an octagonal mirror having eight reflection surfaces including the first and second reflection surfaces 240a and 240b.

For example, as the light source unit 210 and the synchronization detection sensor 261 are installed on a single circuit substrate 280 due to the first and second incident light path changing members 230ab and 230cd, the number of components of the light scanning unit 200 is reduced, thereby facilitating assembly of the light scanning unit 200 and reduction of the manufacturing costs.

Also, when the first and second incident light path changing members 230ab and 230cd are not included, as denoted by a dotted line in FIG. 4, a distance D2' between a light source unit 210' and a rotational axis C of the light deflector 240 is increased. On the contrary, according to the current embodiment in FIG. 4, a light path in the incident optical system 220 is folded by the first and second incident light path changing members 230ab and 230cd in the light scanning unit 200, and thus a distance D1' between the light source unit 210 and a rotational axis C of the light deflector 240, which is a center of the light deflector 240, is shortened and the size of the light scanning unit 200 may be further reduced.

FIG. 5 illustrates a detailed example of an arrangement of the imaging optical system 250 in the light scanning unit 200. The optical components of the light scanning unit 200 are closely sealed in a housing 290, and the first through fourth light beams L1, L2, L3, and L4 are scanned through corresponding windows 291a, 291b, 291c and 291d to the outside. As described above, the positions of photosensitive drums 31 may be limited by the instrumental arrangement in an image forming apparatus, and thus light paths of the first through fourth light beams L1, L2, L3, and L4 in the imaging optical system 250 may be folded by the mirrors M1, M2, M3, M4, M5, and M6 according to positions of the photosensitive drums 31.

Figure 6:
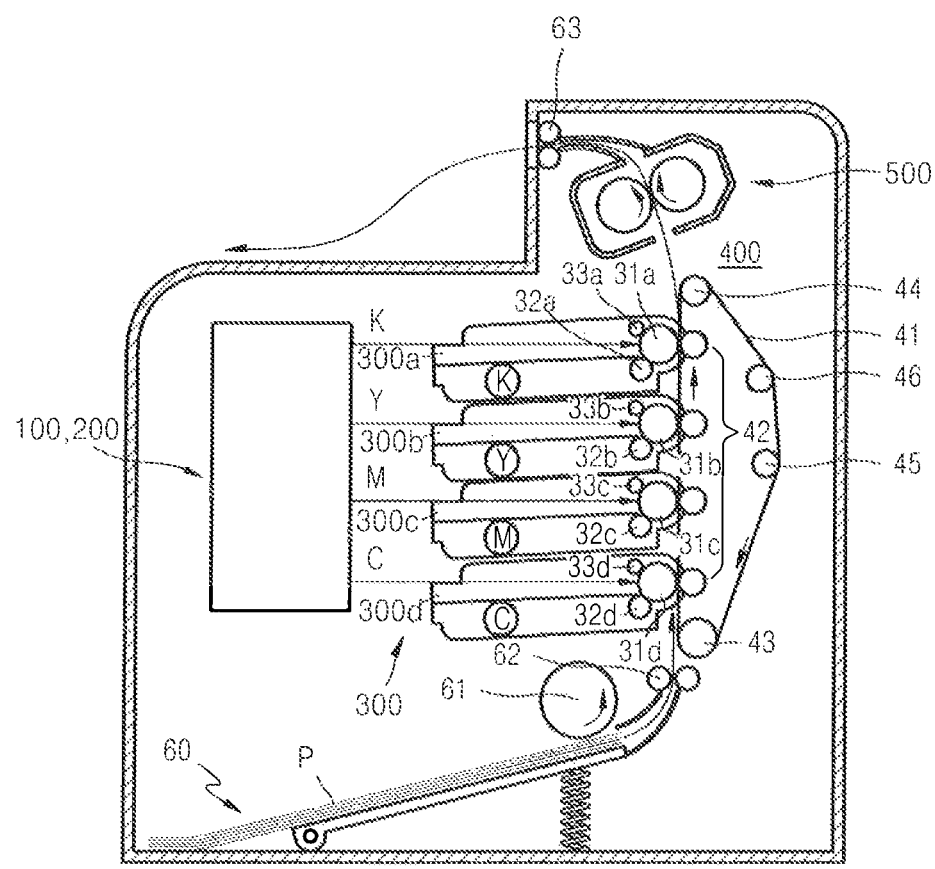
FIG. 6 is a schematic structural diagram illustrating an image forming apparatus according to an embodiment of the present general inventive concepts.

FIG. 6 is a schematic structural diagram illustrating an image forming apparatus according to an embodiment of the present general inventive concepts.

Referring to FIG. 6, the image forming apparatus includes a light scanning unit 100 or 200, a plurality of developing units 300, a transfer unit 400, and a fixing unit 500.

The light scanning unit 100 or 200 may be the light scanning unit 100 or 200 described above. In order to print a color image, the light scanning unit 100 or 200 scans a plurality of light beams, and the plurality of developing units 300, one for each color, may be formed to correspond to the plurality of light beams. In this regard, the light scanning unit 100 or 200 may simultaneously scan a plurality of light beams using one rotational polygonal mirror 140 or 240 as described above with reference to the above embodiments (refer to FIG. 1 or FIG. 4). For example, the light scanning unit 100 or 200 may scan four light beams corresponding to black (K), magenta (M), yellow (Y), and cyan (C), and four developing units 300a, 300b, 300c and 300d for black (K), magenta (M), yellow (Y), and cyan (C) may be formed to correspond to the four light beams for black (K), magenta (M), yellow (Y), and cyan (C). As described above, the size of the light scanning unit 100 or 200 may be reduced as the light scanning unit 100 or 200 folds light paths between the light source unit 110 or 210 (as shown in FIG. 1 or FIG. 4) and the polygonal mirrors 140 or 240, thereby reducing the size of the light scanning unit 100 or 200 and consequently the size of the image forming apparatus.

Because the developing units 300a, 300b, 300c and 300d are similar in structure except for the colors, the developing units 300a, 300b, 300c and 300d are collectively referred as the developing unit 300. Similarly, photosensitive drums 31a, 31b, 31c and 31d are collectively referred as a photosensitive drum 31, developing rollers 32a, 32b, 32c and 32d are collectively referred as a developing roller 32, and charge rollers 33a, 33b, 33c and 33d are collectively referred as a charge roller 33. The developing unit 300 includes a photosensitive drum 31, that is, an image receptor, on which an electrostatic latent image is formed, and a developing roller 32 for developing the electrostatic latent image.

The photosensitive drum 31, that is, a photoreceptor, may be a cylindrical metal pipe having a photosensitive layer that has a predetermined thickness and is formed on an outer circumference of the cylindrical metal pipe. Although not shown herein, a photosensitive belt may be employed as the photoreceptor. The outer circumference of the photosensitive drum 31 is a surface that is to be exposed. A charge roller 33 is disposed on the outer circumference of the photosensitive drum 31 on an upstream portion of a region that is to be exposed to the light scanning unit 100 or 200. The charge roller 33 is a charging unit that contacts the photosensitive drum 31 and rotates to charge the surface of the photosensitive drum 31 with a uniform charge. A charge bias is applied to the charge roller 33. A corona charging unit (not shown) may be used instead of the charge roller 33.

The developing roller 32 having toner corresponding to its color adhered to its outer circumference supplies toner to the photosensitive drum 31. A development bias is applied to the developing roller 32 to supply toner to the photosensitive drum 31. Although it is not illustrated in the drawings, the developing unit 300 may further include a supply roller for allowing the toner contained in the developing units 300 to adhere to the developing roller 32, a restriction unit for restricting an amount of the toner adhered to the developing roller 32, and an agitator for transporting the toner contained in the developing unit 300 to the supply roller and/or the developing roller 32.

The transfer unit 400 may include a paper transfer belt 41 and four transfer rollers 42. The paper transfer belt 41 is arranged to face a region of the outer circumference of the photosensitive drum 31 exposed out of the developing unit 300. The paper transfer belt 41 circulates by being supported by a plurality of support rollers 43, 44, 45, and 46. The four transfer rollers 42 are arranged to face the photosensitive drums 31a, 31b, 31c and 31d of each of the developing units 300a, 300b, 300c and 300d with the paper transfer belt 41 interposed therebetween. A transfer bias is applied to each of the transfer rollers 42.

A color image forming process that may be performed by the electrophotographic image forming apparatus configured as above will now be described.

The photosensitive drum 31 of the developing unit 300 is charged to a uniform electric potential by a charge bias applied to the charging roller 33. The light scanning unit 100 or 200 scans a light beam corresponding to image formation about its color to the photosensitive drum 31. In particular, the light scanning unit 100 or 200 scans four light beams corresponding to image information about cyan (C), magenta (M), yellow (Y), and black (K) colors to corresponding photosensitive drums 31a, 31b, 31c and 31d of the developing units 300a, 300b, 300c and 300d to form respective electrostatic latent images. A development bias is applied to each of the developing rollers 32a, 32b, 32c and 32d. Then, respective toner adhered to the outer circumferences of the developing rollers 32a, 32b, 32c and 32d adheres to the electrostatic latent images on the photosensitive drums 31a, 31b, 31c and 31d so that toner images of cyan, magenta, yellow, and black may be respectively formed on the photosensitive drum 31a, 31b, 31c and 31d of the developing units 300a, 300b, 300c and 300d.

A medium that finally receives the toner image, for example, paper P, is ejected from a cassette 60 by a pickup roller 61. The paper P is transferred to the paper transfer belt 61 by a transfer roller 62. The paper P adheres to a surface of the paper transfer belt 61 due to an electrostatic force and is transferred at the same velocity as a running linear velocity of the paper transfer belt 61.

For example, a leading end of the paper P arrives at a transfer nip at the same time as when a leading end of a toner image of cyan (C) formed on the outer circumferential surface of one photosensitive drum 31 of one developing unit 300 arrives at the transfer nip facing the transfer roller 42. When a transfer bias is applied to the transfer roller 42, the toner images formed on the photosensitive drums 31a, 31b, 31c and 31d are transferred to the paper P. As the paper P is transferred, toner images of magenta (M), yellow (Y), and black (K) formed on the photosensitive drums 31a, 31b, 31c and 31d of the other developing units 300a, 300b, 300c and 300d are sequentially transferred to the paper P to overlap with one another. Accordingly, a color toner image is formed on the paper P.

The color toner image transferred to the paper P is maintained on a surface of the paper P due to an electrostatic force. The fixing device 500 fixes the color toner image on the paper P by using heat and pressure. The paper P after being subjected to the fixing process is ejected out of the image forming apparatus by an eject roller 63.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A light scanning unit comprising:
a light source unit to emit a plurality of light beams;
a light deflector to deflect the plurality of light beams emitted from the light source unit in a main scanning direction; and
an incident optical system to allow the plurality of light beams emitted from the light source unit to be incident on different reflection surfaces of the light deflector,
wherein the incident optical system comprises at least one incident light path changing member that folds light paths of the plurality of light beams between the light source unit and the light deflector,
the light source unit comprises a plurality of light sources to respectively emit a plurality of light beams,
the plurality of light sources are installed on a single circuit substrate,
the light deflector comprises at least five reflection surfaces; and
the emitted light beams pass over the light deflector before reaching the at least one incident light path changing member.

2. The light scanning unit of claim 1, wherein:
the light deflector comprises N reflection surfaces;
a main scanning incident angle is an angle between a light beam that is incident to the light deflector and a light beam that is deflected by the light deflector and proceeds toward a center of a scanning surface; and the incident optical system allows a plurality of light beams emitted from the light source unit to be incident on the light deflector at a main scanning incident angle of 360°/N.

3. The light scanning unit of claim 2, wherein the light deflector receives a light beam incident on a first reflection surface and a light beam incident on a second reflection surface symmetrically at opposite sides with respect to the light deflector.

4. The light scanning unit of claim 1, further comprising:
a synchronization detection sensor to detect any of the plurality of light beams deflected by the light deflector.

5. The light scanning unit of claim 4, wherein the synchronization detection sensor detects a first scanning end from among the first scanning end and a second scanning end of a main scanning line of any of the plurality of light beams deflected by the light deflector.

6. The light scanning unit of claim 5, further comprising:
a synchronization light path changing member that is disposed between the light deflector and the synchronization detection sensor and folds a light path of a light beam to detect synchronization.

7. The light scanning unit of claim 6, wherein the synchronization detection sensor is installed on a single circuit substrate together with the plurality of light sources.

8. The light scanning unit of claim 6, wherein the synchronization light path changing member is formed as a single unit with an incident light path changing member that folds a light path of the light beam to detect synchronization in an incident optical system.

9. The light scanning unit of claim 4, further comprising:
a synchronization detection lens disposed between the light deflector and the synchronization detection sensor.

10. The light scanning unit of claim 1, wherein the at least one incident light path changing member comprises a mirror.

11. The light scanning unit of claim 1, wherein:
the light source unit comprises first through fourth light sources to respectively emit first through fourth light beams; and
the incident optical system allows the first and second light beams emitted from the first and second light sources to be incident on a first reflection surface of the light deflector, and allows the third and fourth light beams emitted from the third and fourth light sources to be incident on a second reflection surface of the light deflector.

12. The light scanning unit of claim 11, wherein:
an incident angle of a light beam incident on a reflection surface of the light deflector in a sub-scanning direction is referred to as a sub-scanning incident angle; and
the incident optical system allows the first and second light beams emitted from the first and second light sources to be incident on the first reflection surface of the light deflector at different sub-scanning incident angles, and allows the third and fourth light beams emitted from the third and fourth light sources to be incident on the second reflection surface of the light deflector at different sub-scanning incident angles.

13. The light scanning unit of claim 12, wherein sub-scanning incident angles of the first through fourth light beams are in a range from 0 to 10 degrees.

14. The light scanning unit of claim 11, wherein the at least one incident light path changing member comprises a first incident light path changing member to fold light paths of the first and second light beams emitted from the first and second light sources and a second incident light path changing member to fold light paths of the third and fourth light beams emitted from the third and fourth light sources.

15. The light scanning unit of claim 11, wherein the first through fourth light sources are installed on a single circuit substrate.

16. The light scanning unit of claim 11, wherein the light deflector receives first and second light beams incident on the first reflection surface and third and fourth light beams incident on the second reflection surface symmetrically at opposite sides with respect to the light deflector.

17. The light scanning unit of claim 16, further comprising:
a synchronization detection sensor to detect any of the first through fourth light beams deflected by the light deflector.

18. The light scanning unit of claim 17, further comprising:
a synchronization light path changing member that is disposed between the light deflector and the synchronization detection sensor and folds a light path of a light beam to detect synchronization.

19. The light scanning unit of claim 18, wherein the synchronization light path changing member is formed as a single unit with an incident light path changing member that folds a light path of the light beam to detect synchronization, in the incident optical system.

20. The light scanning unit of claim 18, wherein the first through fourth light sources and the synchronization detection sensor are installed on a single circuit substrate.

21. The light scanning unit of claim 1, wherein the incident optical system further comprises at least one of a collimating lens, a cylindrical lens, and an aperture stop.

22. The light scanning unit of claim 1, further comprising an imaging optical system that allows a plurality of light beams that are deflected by the light deflector, to be imaged on different scanning surfaces.

23. An image forming apparatus, comprising:
a light scanning unit comprising:
a light source unit to emit a plurality of light beams;
a light deflector to deflect the plurality of light beams emitted from the light source unit in a main scanning direction; and
an incident optical system to allow the plurality of light beams emitted from the light source unit to be incident on different reflection surfaces of the light deflector;
a developing unit that is disposed at an imaging point of each of the plurality of light beams emitted from the light scanning unit and comprises: a plurality of photoconductors, on which respective electrostatic latent images are formed according to the plurality of light beams, and a developing roller that develops the electrostatic latent image formed on the plurality of photoconductors; and
a transferring unit onto which the image developed by the developing unit is transferred,
wherein the incident optical system comprises at least one incident light path changing member that folds light paths of the plurality of light beams between the light source unit and the light deflector,
the light source unit comprises a plurality of light sources to respectively emit a plurality of light beams,
the plurality of light sources are installed on a single circuit substrate,
the light deflector comprises at least five reflection surfaces; and
the emitted light beams pass over the light deflector before reaching the at least one incident light path changing member.

24. The image forming apparatus of claim 23, wherein the light deflector comprises N reflection surfaces, wherein a main scanning incident angle is an angle between a light beam that is incident to the light deflector and a light beam that is deflected by the light deflector and proceeds toward a center of a scanning surface, and wherein the incident optical system allows a plurality of light beams emitted from the light source unit to be incident on the light deflector at a main scanning incident angle of 360°/N.

25. The image forming apparatus of claim 24, wherein the light deflector receives a light beam incident on a first reflection surface and a light beam incident on a second reflection surface symmetrically at opposite sides with respect to the light deflector.

26. The image forming apparatus of claim 23, further comprising a synchronization detection sensor to detect any of the plurality of light beams deflected by the light deflector.

27. The image forming apparatus of claim 26, wherein the synchronization detection sensor detects a first scanning end among the first scanning end and a second scanning end of a main scanning line of any of the plurality of light beams deflected by the light deflector.

28. The image forming apparatus of claim 27, further comprising a synchronization light path changing member that is disposed between the light deflector and the synchronization detection sensor and folds a light path of a light beam to detect synchronization.

29. The image forming apparatus of claim 28, wherein the synchronization detection sensor is installed on a single circuit substrate together with the plurality of light sources.

30. The image forming apparatus of claim 28, wherein the synchronization light path changing member is formed as a single unit with an incident light path changing member that folds a light path of the light beam for detecting synchronization, in an incident optical system.

31. The image forming apparatus of claim 26, further comprising a synchronization detection lens disposed between the light deflector and the synchronization detection sensor.

32. A light scanning unit comprising:
a light source unit to emit a plurality of light beams;
a light deflector to deflect the plurality of light beams along a plurality of main scanning directions; and
an optical system having at least one incident light path changing member disposed opposite to the light source unit with respect to the main scanning directions to direct the plurality of light beams to different surfaces of the light deflector, wherein the light source unit comprises a plurality of light sources to respectively emit a plurality of light beams, the plurality of light sources are installed on a single circuit substrate, the light deflector comprises at least five reflection surfaces; and the emitted light beams pass over the light deflector before reaching the at least one incident light path changing member.

33. The light scanning unit of claim 32, wherein:
the at least one incident light path changing member is disposed to have a first travel path from the light source unit having a first travel length and a second travel path from the light deflector having a second travel length; and the first travel length is longer than the second travel length.

34. The light scanning unit of claim 33, wherein an angle between the first travel path and the second travel path is greater than 0° and less than 90°.

35. The light scanning unit of claim 32, wherein the emitted light beams are substantially parallel to one another before reaching the at least one incident light path changing member.

* * * * *